(12) United States Patent
Siegel

(10) Patent No.: US 6,598,512 B2
(45) Date of Patent: Jul. 29, 2003

(54) PISTON PUMP

(75) Inventor: Heinz Siegel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 09/940,459

(22) Filed: Aug. 29, 2001

(65) Prior Publication Data

US 2002/0028149 A1 Mar. 7, 2002

(30) Foreign Application Priority Data

Aug. 29, 2000 (DE) ........................................ 100 42 369

(51) Int. Cl.$^7$ ................................................ F15B 21/04
(52) U.S. Cl. ............................................ 92/83; 92/168
(58) Field of Search ................................ 92/83, 165 R, 92/168, 86

(56) References Cited

U.S. PATENT DOCUMENTS 3,774,506 A * 11/1973 Van Der Aa ................... 92/83
6,389,955 B1 * 5/2002 Schaefer ........................ 92/86

* cited by examiner

Primary Examiner—Edward K. Look
Assistant Examiner—Michael Leslie
(74) Attorney, Agent, or Firm—Ronald E. Greigg

(57) ABSTRACT

The invention relates to a piston pump, for instance for an electrohydraulic vehicle brake system. The invention proposes that a pump piston, on an end toward an eccentric element, be sealed off with a sealing ring, such as a quad ring, that has two axially spaced-apart sealing lips, which sealing ring has radial openings, and also proposes that interstices between the axially spaced-apart sealing lips be connected, through a fluid line, to a fluid supply container from which the piston pump aspirates fluid, or to a pump inlet, whereby in the event of a leak of a sealing lip, the piston pump will aspirate brake fluid through the fluid line and prevent the piston pump from aspirating air from the direction of an eccentric element.

7 Claims, 1 Drawing Sheet

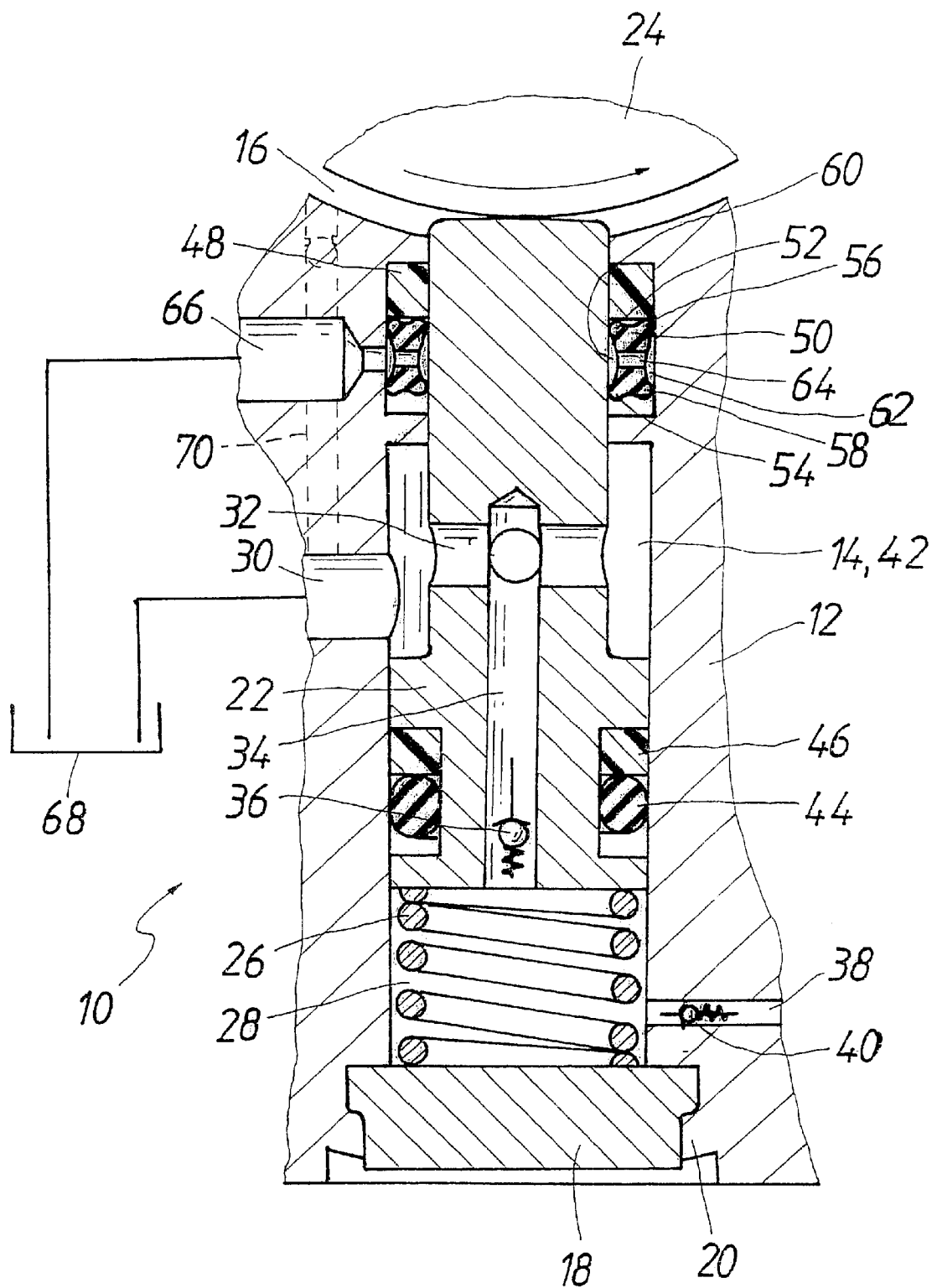

PISTON PUMP

BACKGROUND OF THE INVENTION

1. Field of the Invention

The invention relates to a piston pump intended in particular for pumping brake fluid in a vehicle brake system that has traction control and/or an electrohydraulic vehicle brake system.

2. Description of the Prior Art

The known piston pumps of the type with which this invention is concerned have a pump piston, which is received axially displaceably in a pump bore that is mounted in a pump housing. For driving the pump piston, the known piston pumps have a rotationally drivable eccentric element, which is disposed on one face end of the pump piston in the pump housing. By rotational drive of the eccentric element, the pump piston is driven to execute an axially reciprocating stroke motion in the pump bore and in so doing pumps fluid in a manner known per se. For sealing off the pump piston in the pump bore, the known piston pumps have a sealing ring, which is disposed between a pump inlet and the eccentric element in the pump bore. This sealing ring seals off the piston pump from the eccentric element. When brake fluid is aspirated, this sealing ring prevents the aspiration of air, for instance, into the pump bore from the side of the eccentric element. The sealing ring also prevents the fluid that is to be pumped from escaping out of the pump bore in the direction of the eccentric element.

OBJECTS AND SUMMARY OF THE INVENTION

In the piston pump of the invention having the characteristics of claim 1, the sealing ring, which seals off the piston pump from the eccentric element, has two axially spaced-apart, encompassing sealing points. The fact that the pump piston or pump bore is sealed off at two axially spaced-apart points already provides an improvement in the sealing action. Especially in the event of a temporary or even a permanent leak of a sealing point, the piston pump is still sealed off from the eccentric element by the other sealing point of the sealing ring. The piston pump remains capable of pumping without restriction. A temporary leak can be caused for instance by dirt particles, which reach the sealing point between the sealing ring and a surface of the pump piston or pump bore on which the sealing ring rests with the encompassing sealing point. In the low-temperature range, for instance of −30° and below, as well, a sealing action of the sealing points of the sealing ring can be impaired. If the temperature rises to higher values again, the sealing action is again fully available.

The piston pump of the invention also has a fluid line, which connects an interstice between the two sealing points of the sealing ring to a supply of fluid to be pumped by the piston pump. The fluid line connects the interstice between the two sealing points of the sealing ring in particular to a supply container that contains the fluid to be pumped, or to a pump inlet. Through the fluid line, the piston pump of the invention, in the event of a temporary or permanent leak of one sealing point of the sealing ring, aspirates fluid out of the supply into the pump bore. This prevents air, for instance, from being aspirated from the eccentric element into the pump bore in the event of a temporary or permanent leak of the sealing ring. If fluid under pressure reaches the sealing ring during a pumping stroke of the piston pump, and if the sealing ring has a temporary or permanent leak, then the fluid passes through the fluid line into the supply of fluid to be pumped and does not escape out of the pump bore in the direction of the eccentric element. The invention has the advantage that in the event of a temporary or permanent leak of the sealing ring, an aspiration of air, for instance, from the direction of the eccentric element into the pump bore is avoided, as is an escape of fluid in the direction of the eccentric element during a pumping stroke. Another advantage of the invention is that with slight changes, it can be realized in existing piston pumps; an existing piston pump need not be completely reconstructed or substantially altered in order to realize the invention; slight changes that can be accomplished at little effort or expense make it possible to realize the invention in existing piston pumps. Especially in large-scale mass production of a piston pump, the invention can be adopted at little effort or expense.

The piston pump of the invention is intended in particular as a pump in a brake system of a vehicle and is used to control the pressure in wheel brake cylinders. Depending on the type of brake system, the abbreviations ABS (for antilock brake system), TCS (traction control system), VDC (vehicle dynamics control) and EHB (electrohydraulic brake system) are used for such brake systems. In the brake system, the pump serves for instance to return brake fluid from a wheel brake cylinder or a plurality of wheel brake cylinders to a master cylinder (ABS) and/or to pump brake fluid out of a supply container into one or more wheel brake cylinder (TCS or VDC or EHB). In a brake system with wheel slip control (ABS or TCS) and/or a brake system serving as a steering aid (VDC) and/or an electrohydraulic brake system (EHB), the pump is needed. With wheel slip control (ABS or TCS), locking of the wheels of the vehicle during a braking event involving strong pressure on the brake pedal (ABS) and/or spinning of the driven wheels of the vehicle in the event of strong pressure on the gas pedal (TCS) can for instance be prevented. In a brake system serving as a steering aid (VDC), a brake pressure is built up in one or more wheel brake cylinder independently of an actuation of the brake pedal or gas pedal, for instance to prevent the vehicle from breaking out of the track desired by the driver. The pump can also be used in an electrohydraulic brake system (EHB), in which the pump pumps the brake fluid into the wheel brake cylinder or cylinders if an electric brake pedal sensor detects an actuation of the brake pedal, or in which the pump is used to fill a reservoir of the brake system.

BRIEF DESCRIPTION OF THE DRAWING

The invention will be better understood and further objects and advantages thereof will become more apparent from the ensuing detailed description of a preferred embodiment taken in conjunction with the sole drawing showing a schematic axial section through a piston pump of the invention.

DESCRIPTION OF THE PREFERRED EMBODIMENT

The piston pump of the invention shown in the drawing and identified overall by reference numeral 10 is intended for use in an electrohydraulic vehicle brake system, not otherwise shown. A pump housing 12 of the piston pump 10 is formed by a hydraulic block of the electrohydraulic vehicle brake system. In the hydraulic block, of which only a fragment surrounding the piston pump 10 has been shown for the sake of clarity, in addition to the piston pump 10 still other hydraulic components, not shown, such as magnet valves, hydraulic reservoirs and damper chambers, are accommodated and hydraulically interconnected. Via brake lines, wheel brake cylinders, not shown, of the electrohydraulic vehicle brake system are connected to the hydraulic block.

In the hydraulic block that forms the pump housing 12, a stepped pump bore 14 is provided. On one side, the pump bore 14 discharges into a cylindrical eccentric chamber 16, whose axis radially intersects an axis of the pump bore 14. On a side remote from the eccentric chamber 16, the pump bore 14 discharges on an outer side of the pump housing 12. On this side, the pump bore 14 is closed with a closure part 18. The closure part 18 is inserted into a step of the pump bore 14 and secured by an encompassing calking 20. The closure part 18 closes off the pump bore 14 in fluid- and pressure-tight fashion.

A pump piston 22 is received axially displaceably in the pump bore 14. For driving the pump piston 22 to execute an axially reciprocating stroke motion in the pump bore 14, the piston pump 10 of the invention has an eccentric element 24, which can be driven to rotate by an electric motor. The eccentric element 24 is accommodated in the eccentric chamber 16; an axis of rotation of the eccentric element 24 intersects the axis of the pump bore 14 radially. The eccentric element 24 is cylindrical, and its axis of rotation is located eccentrically to a circumference of the eccentric element 24.

The piston pump 10 has a restoring spring element 26, which in the exemplary embodiment of the invention described and shown is embodied as a helical compression spring. The restoring spring element 26 is inserted into the pump bore 14 between the closure part 18 and the pump piston 22; the restoring spring element 26 is braced on the closure part 18 and presses the pump piston 22 against a circumference of the eccentric element 24. Driving the eccentric element 24 to rotate causes the eccentric element 24 to make the pump piston 22, resting on its circumference, execute the axially reciprocating stroke motion in the pump bore 14. In its stroke motion, the pump piston 22 alternatingly decreases and increases a volume of a pump chamber 28 of the piston pump 10 and as a result pumps fluid, in the manner known per se for piston pumps; in the exemplary embodiment of the invention shown and described, the fluid is brake fluid. The pump chamber 28 is a portion of the pump bore 14 between the closure part 18 and the pump piston 22.

For admitting fluid, the piston pump 10 has a pump inlet 30. The pump inlet 30 is embodied as a bore in the pump housing 12, which discharges radially and approximately in a longitudinal center region of the pump piston 22 into the pump bore 14. Through the pump bore 14, the pump inlet 30 communicates with transverse bores 32, which are mounted, intersecting one another, approximately at a longitudinal center of the pump piston 22. The transverse bores 32 discharge into an axial blind bore 34, which extends from the transverse bores 32 to the pump chamber 28. An inlet valve 36 of the piston pump 10 is disposed in the blind bore 34. The inlet valve 36, shown for the sake of simplicity as a symbol in the drawing, is embodied as a spring-actuated check valve.

A pump outlet 38 of the piston pump 10 is embodied as a bore in the pump housing 12 that is disposed radially to the pump bore 14 and discharges into the pump chamber 28. An outlet valve 40 is disposed in the pump outlet 38, embodied in the exemplary embodiment of the invention shown and described as a spring-actuated check valve and shown for the sake of simplicity as a symbol in the drawing.

The pump piston 22 is embodied as a stepped piston; on a portion toward the eccentric element 24, it has a smaller diameter than on a portion remote from the eccentric element 24. The piston pump 10 of the invention shown in the drawing is accordingly a stepped piston pump. Because of its embodiment as a stepped piston, the pump piston 22 is surrounded, in a middle region, by an annular chamber 42 in the pump bore 14. The annular chamber 42 is located in the region of the transverse bores 32 of the pump piston 22 and in the region of the pump inlet 30. The annular chamber 42 is an interstice between the pump bore 14 and the pump piston 22.

The embodiment of the pump piston 22 as a stepped piston and the attendant embodiment of the annular chamber 42 have the following purpose: In a pumping stroke of the pump piston 22, in which the pump piston 22 is displaced in the direction of the closure part 18 by the eccentric element 24, and as a result of which a volume of the pump chamber 28 is decreased and brake fluid is positively displaced out of the pump chamber 28 into the pump outlet 38, a volume of the annular chamber 42 increases; that is, during the pumping stroke of the pump piston 22, the piston pump 10 aspirates brake fluid through the pump inlet 30 into the annular chamber 42. During a return stroke of the pump piston 22, in which the restoring spring element 26 displaces the pump piston 22 away from the closure part 18, the volume of the annular chamber 42 does decrease, but at the same time the volume of the pump chamber 28 increases. Because of the greater cross-sectional area of the pump chamber 28 compared to the cross-sectional area of the annular chamber 42, the volumetric increase of the pump chamber 28 is greater than the volumetric decrease of the annular chamber 42. Through the inlet valve 36 opened during the return stroke, brake fluid flows out of the annular chamber 42 into the pump chamber 28. Since the volumetric increase of the pump chamber 28 is greater than the volumetric decrease of the annular chamber 42, brake fluid is aspirated through the pump inlet 30, the annular chamber 42, the transverse bores 32 and the blind bore 34 during the return stroke of the pump piston 22 as well. Because of its embodiment as a stepped piston pump, the piston pump 10 aspirates brake fluid both during the pumping stroke and during the return stroke.

On its end toward the pump chamber 28, the pump piston 22 is sealed off in the pump bore 14 with a sealing ring 44 and is guided axially displaceably in the pump bore 14 by a guide ring 46. The sealing ring 44 and the guide ring 46 are inserted axially side by side into a common encompassing groove in the pump piston 22.

On its end toward the eccentric element 24, the pump piston 22 is guided by a guide ring 48 axially displaceably in the pump bore 14 and is sealed off in the pump bore 14 by a sealing ring 50. The guide ring 48 and the sealing ring 50 are inserted axially side by side into a common encompassing groove in the pump housing 12. The sealing ring 50 and the guide ring 48 on the end of the pump piston 22 toward the eccentric element are accordingly structurally connected to the housing; in a stroke motion of the pump piston 22, they slide over its circumferential surface. The guide ring 48 and the sealing ring 50 are disposed between the pump inlet 30 and the eccentric element 24, or eccentric chamber 16, and the sealing ring 50 seals off the pump bore 14 from the eccentric chamber 16.

The sealing ring 50 on the end of the pump piston 22 toward the eccentric element is embodied as a so-called quad ring. Both on its inside and on its outside, it has two encompassing, axially spaced-apart sealing points 52, 54, 56, 58 each, in the form of sealing beads. The two sealing points 52, 54 on the inside of the sealing ring 50 rest sealingly on the circumferential surface of the pump piston 22; between themselves, the circumferential surface of the pump piston 22 and the sealing ring 50, they enclose an interstice 60. The two sealing points 56, 58 on the outside of the sealing ring 50 rest sealingly on a wall of the pump bore 14, or more precisely on a bottom of the encompassing groove in the pump housing 12, into which the sealing ring 50 is inserted jointly with the guide ring 48. The sealing points 56, 58, between themselves, the bottom of the encompassing groove and the sealing ring 50, enclose an interstice 62 on the outside of the sealing ring 50. The sealing ring 50 is provided with a number of openings 64, distributed over its circumference, in the form of radial holes, which connect the interstice 60 between the sealing points 52, 54 on the inside of the sealing ring 50 with the interstice 62 between the sealing points 56, 58 on the outside of the sealing ring 50. A fluid line 66, mounted as a bore radially to the pump bore 14 in the pump housing 12, discharges into the interstice 62 between the sealing points 56, 58 on the outside of the sealing ring 50. The fluid line 66 connects the interstice 62 between the sealing lips 56, 58 on the outside of the sealing ring 50 to a fluid supply container 68, from which the piston pump 10 aspirates fluid through the pump inlet 30. In the exemplary embodiment of the invention shown, the fluid supply container 68 is a brake fluid supply container of the electrohydraulic vehicle brake system, not shown. Through the openings 64 of the sealing ring 50, the fluid line 66 also connects the interstice 60 between the sealing points 52, 54 on the inside of the sealing ring 50 to the fluid supply container 68.

The fluid line 66 of the piston pump 10 of the invention has the following purpose: If one of the two sealing points 54, 58, remote from the eccentric element 24 and oriented toward the annular chamber 42, on the inside or outside of the sealing ring 50 leaks temporarily or permanently, the piston pump 10 aspirates brake fluid through the fluid line 66 from the fluid supply container 68 into the interstice 60, 62 on the inside or outside of the sealing ring 50. From the interstice 60, 62, the brake fluid passes through the leaking sealing point 54, 58 into the pump bore 14 and from there into the annular chamber 42. The invention prevents air from being aspirated out of the eccentric chamber 16 into the pump bore 14 in the event of a leak of one of the sealing points 54, 58.

In a modified embodiment of a piston pump 10 of the invention, the fluid line 66 communicates through a bore 70 in the pump housing 12 with the pump inlet 30 instead of with the fluid supply container 68. In the illustrated exemplary embodiment of the invention, the bore 70 is represented by dashed lines. In that case, the connection to the fluid supply container 68 is omitted. In this modified embodiment of the invention, the piston pump 10, in the event of a leak of one of the sealing points 54, 58, remote from the eccentric element 24, of the sealing ring 50 aspirates brake fluid out of the pump inlet 30 instead of out of the fluid supply container 68.

The foregoing relates to a preferred exemplary embodiment of the invention, it being understood that other variants and embodiments thereof are possible within the spirit and scope of the invention, the latter being defined by the appended claims.

I claim:

1. A piston pump, comprising a pump piston that is received axially displaceably in a pump bore in a pump housing and is driven in an axially reciprocating stroke motion in the pump bore, a sealing ring that is disposed, surrounding the pump piston, between a pump inlet and an eccentric element in the pump bore and that performs sealing between the pump piston and the pump housing, said sealing ring (50) having two axially spaced-apart encompassing sealing points (52, 54, 56, 58), and that the piston pump (10) has a fluid line (66), connecting an interstice (60, 62) between the two sealing points (52, 54, 56, 58) of the sealing ring (50) to a supply (68) of fluid to be pumped by the piston pump (10).

2. The piston pump according to claim 1, wherein said fluid line (66) connects the interstice (60, 62) between the two sealing points (52, 54, 56, 58) of the sealing ring (50) to the pump inlet (30).

3. The piston pump according to claim 1, wherein said fluid line (66) connects the interstice (60, 62) between the two sealing points (52, 54, 56, 58) of the sealing ring (50) to a fluid supply container (68), from which the piston pump (10) pumps fluid.

4. The piston pump according to claim 1, wherein said two sealing points (52, 54) are embodied on an inside of the sealing ring (50), and that the sealing ring (50) has an opening (64), which connects the interstice (60) between the two sealing points (52, 54) on the inside of the sealing ring (50) to an outside of the sealing ring (50).

5. The piston pump according to claim 1, wherein said sealing ring (50) comprises a plurality of encompassing sealing elements.

6. The piston pump according to claim 1, wherein said sealing ring (50) is a quad ring.

7. The piston pump according to claim 1, wherein said piston pump (10) is a stepped piston pump.

* * * * *